United States Patent [19]
Folts

[11] 3,739,640
[45] June 19, 1973

[54] ELECTROMAGNETIC FLOWMETERS FOR BLOOD OR OTHER CONDUCTIVE FLUIDS

[75] Inventor: John D. Folts, Madison, Wis.

[73] Assignee: Wisconsin Alumni Research Foundation, Madison, Wis.

[22] Filed: Feb. 8, 1971

[21] Appl. No.: 113,542

[52] U.S. Cl. .................. 73/194 EM, 128/2.05 F
[51] Int. Cl. .................. G01f 1/00, A61b 5/02
[58] Field of Search .................. 73/194 EM; 128/2.05 F; 330/149

[56] References Cited
UNITED STATES PATENTS

| | | | |
|---|---|---|---|
| 3,316,762 | 5/1967 | Westersten | 73/194 EM |
| 3,605,726 | 9/1971 | Williams et al. | 73/194 EM X |
| 3,608,375 | 9/1971 | Cushing | 73/194 EM |
| 3,339,410 | 9/1967 | Steru | 73/194 EM |
| 3,449,951 | 6/1969 | Westersten | 73/194 EM |
| 3,575,051 | 4/1971 | Moore | 73/194 EM |
| 2,575,364 | 11/1951 | Sink | 330/149 X |
| 2,748,202 | 5/1956 | McCallister et al. | 330/149 X |

OTHER PUBLICATIONS

Bowning et al., Med. & Biol. Engng., Vol. 7, No. 5, pp. 549-558, Sept. 1969.

Primary Examiner—Charles A. Ruehl
Attorney—Burmeister, Palmatier & Hamby

[57] ABSTRACT

The disclosed flowmeter comprises a probe or transducer utilizing a C-shaped electromagnet which includes an energizing coil and is adapted to produce a magnetic field extending across a stream of blood, flowing along a blood vessel, or a stream of some other conductive liquid. The movement of the blood across the magnetic field generates a voltage which is picked up by first and second electrodes. Normally, the coil is energized with an alternating or pulsating current. A first output lead is connected to the first electrode, while second and third output leads are connected to the second electrode. The second and third output leads are on opposite sides of a plane including the electrodes and the first output lead, such plane being parallel to the magnetic field. To minimize transformer-type coupling between the coil and the leads, a potentiometer is connected to the second and third leads. The adjustable tap of the potentiometer and the first output lead are employed as the output connections from the electrodes, the tap being adjusted for minimum error signal output. A grounded electrostatic shield is employed between the coil and the leads. Moreover, a ground electrode is positioned to engage the blood vessel at a neutral point between the first and second electrodes. A second adjustable potentiometer is connected across the supply leads for the coil. The tap of the second potentiometer is grounded and is adjusted for minimum error signal output. One or more adjustable balancing capacitors are connected between at least one of the supply leads and at least one of the output connections. Such capacitors are adjusted for minimum error signal output and are effective to neutralize the distributed capacitances between the coil and the output leads. A soft resilient material, such as silicon rubber, is employed to encapsulate the electromagnet and the output leads. Such material is adapted to be compressed by the pulsations of the blood vessel around which the flowmeter probe or pickup is mounted. Thus, the provision of such soft material prevents damage to the walls of the blood vessel.

22 Claims, 9 Drawing Figures

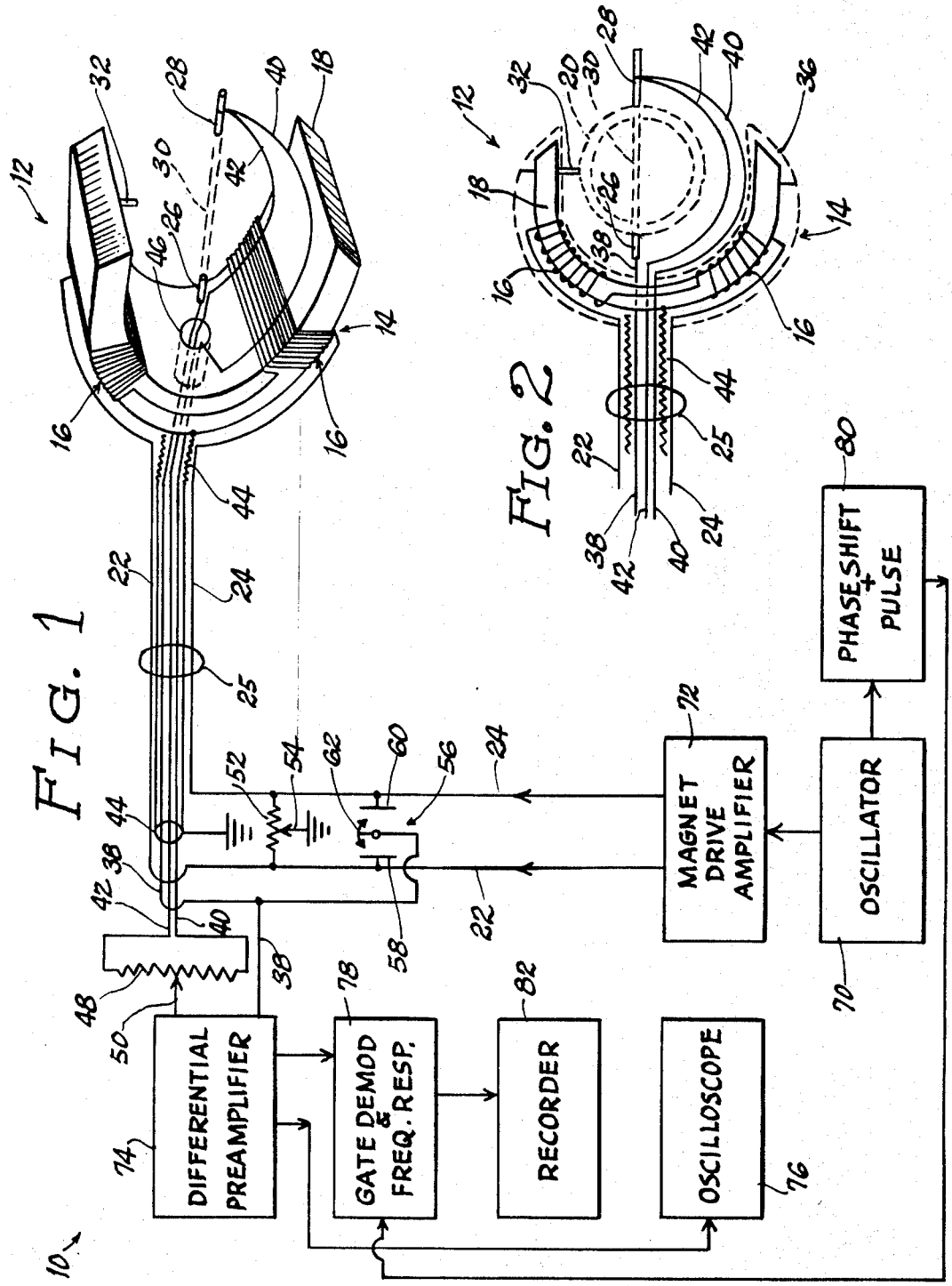

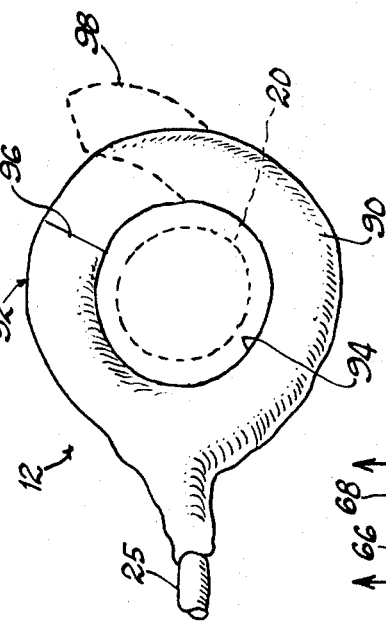
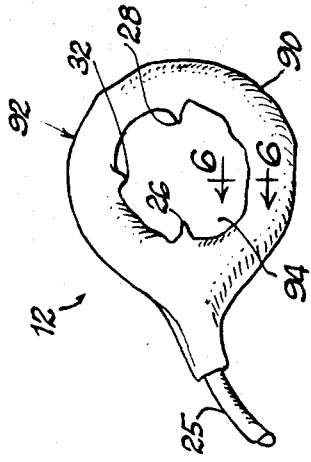
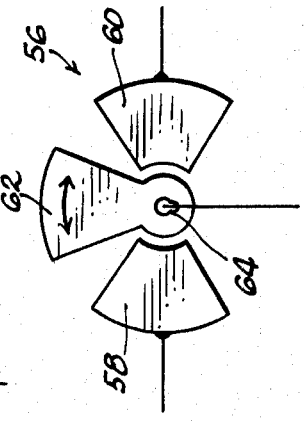
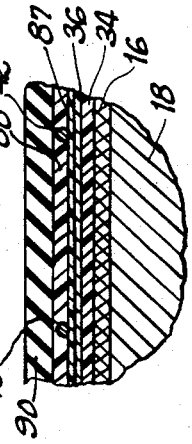
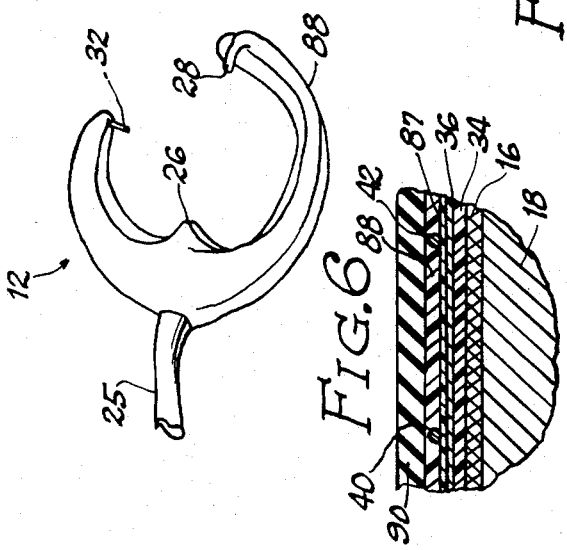
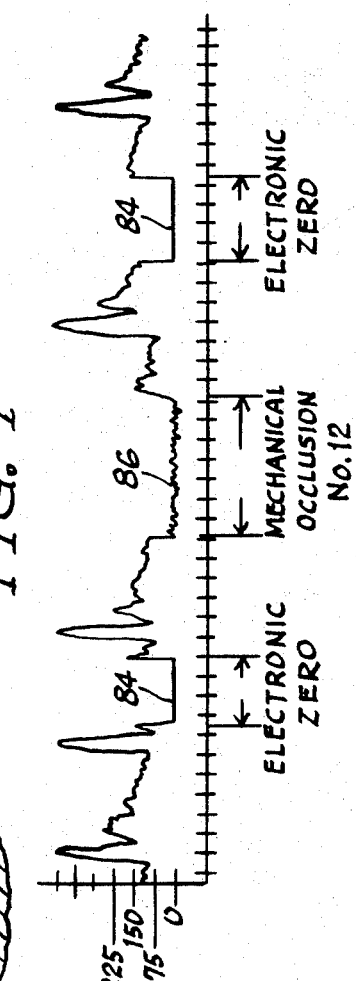

ELECTROMAGNETIC FLOWMETERS FOR BLOOD OR OTHER CONDUCTIVE FLUIDS

The invention described herein was made in the course of work under a grant or award from the Department of Health, Education, and Welfare.

This invention relates to electromagnetic flowmeters, which are particularly well adapted for measuring the flow of blood along a blood vessel. Such flowmeters have been extensively used for research studies of the flow of blood in animals, and to a considerable extent in humans, while surgery is in progress. In the case of animals, flowmeter transducers can be implanted surgically so that blood flow studies can be made on the animals for extended period of time after recovery from surgery. Electromagnetic flowmeters are also applicable to flow measurements in other electrically conductive liquids.

In accordance with the known state of the art, an electromagnetic flowmeter generally comprises an electromagnet for establishing a magnetic field across the stream of blood or some other conductive liquid. The electromagnet is usually implanted around a blood vessel, but it may be mounted around a tube through which the blood is caused to flow. The electromagnet may have a core made of iron or some other magnetic material having a high permeability. For use with blood vessels of small size, the electromagnet is generally provided with an iron core. However, the electromagnet may have a core made of a nonmagnetic material, such as a suitable resinous plastic. Nonmagnetic cores are often used for larger blood vessels, to reduce the weight of the core and to provide a more nearly uniform magnetic field across the blood vessel.

In any event, the electromagnet utilizes an energizing coil which is mounted on the core and is often split into two or more smaller coils. The coil is generally supplied with an alternating or pulsating current.

The electromagnet forms part of a transducer or probe which also includes a pair of electrodes for picking up the small voltage which is generated in the blood by the movement of the blood across the magnetic field. The electrodes are often in the form of small wires or other metal members adapted to contact the walls of the blood vessel at diametrically opposite points. Due to the presence of blood and other body fluids in the blood vessel walls, they are capable of conducting the electrical voltages from the blood stream to the electrodes. Normally, the electrodes are oriented along an axis which is perpendicular to the magnetic field, and also perpendicular to the direction of blood flow. The maximum voltage is generated along such an electrode axis.

When the transducer is of the type in which the blood is caused to flow through a tube made of plastic or the like, the electrodes extend through the walls of the tube at diametrically opposite points so as to be in direct contact with the blood flowing through the tube.

Output leads are connected to the electrodes and are connected to wires which are mounted in a cable. A shield is generally provided in the cable around the output leads so as to minimize the pickup of noise and stray signals by the wires. The supply leads for the energizing coil are also usually brought out in the cable. The shield minimizes the electromagnetic and electrostatic coupling between the supply leads and the output leads.

There tends to be transformer type coupling between the energizing coil and the output leads. The practice has been to minimize such coupling by attempting to mount the electrodes and the output leads in a plane which is strictly parallel to the magnetic field. However, the positioning of the output leads is extremely critical, so that it is difficult to produce transducers in which the transformer coupling is actually at its minimum value. Moreover, it has been found that even when the output leads are correctly adjusted there is an appreciable zero flow signal produced in the electrodes and output leads due to stray coupling between the energizing coil and the output leads. This signal exists even when there is no flow of blood across the magnetic field. The zero flow signal tends to mask and modify the signals which are generated by the flow of blood, so that the accuracy and reliability of the blood flow measurements are impaired. The zero flow signal also results in a difference between the mechanical zero, when no blood is flowing, and the electrical zero, produced when the driving signal is removed from the energizing coil. To obtain a mechanical zero, it is necessary to stop the flow of blood momentarily, by applying a clamp to the blood vessel, or utilizing a remote control device which produces an occlusion or stoppage of the blood vessel. Such a remote control device may utilize a resilient bulb or tube, adapted to be expanded by internally applied air pressure. The expansion of the bulb is employed to tighten a cord or snare around the blood vessel.

In accordance with the present invention, the zero flow signal is reduced, so as to correspond closely with the electronic zero. In this way, the accuracy and reliability of the flowmeter are greatly improved. In accordance with the present invention, provision is made for balancing out the transformer type coupling between the energizing coil and the output leads from the electrodes. This is brought about by providing two output leads from one of the electrodes. Such output leads are positioned on opposite sides of a neutral plane which is parallel to the magnetic field. Thus, the signals produced in the two output leads, due to transformer type coupling, are of opposite polarities. A balancing potentiometer is connected between the two output leads, and the movable tap of the potentiometer is employed as one of the output connections. The other output connect-on is made to the other electrode. By adjusting the tap on the potentiometer, it is possible to achieve a null or a setting in which the stray signals picked up by the output leads are minimized.

It is also preferred to provide a ground electrode, in addition to the two signal electrodes. The ground electrode is positioned to contact the blood stream at a neutral point between the signal electrodes. In the usual case, the signal electrodes contact the blood vessel at diametrically opposite points, while the ground electrode contacts the blood vessel at an intermediate point spaced by 90° from each of the signal electrodes. The ground electrode is connected to ground, generally through the shield in the connecting cable. If an iron core is provided, it is also grounded.

In addition, it is preferred to provide an electrostatic shield between the energizing coil and the output leads. Such shield may advantageously take the form of a thin film or layer of a conductive material, such as, conductive paint applied over a layer of insulating material in which the coil is embedded. The electrostatic shield is also grounded.

It is also preferred to provide a second balancing potentiometer connected across the supply leads for the energizing coil. The adjustable tap of the second potentiometer is grounded. By adjusting the tap, the coupling between the coil and the electrode leads can be minimized.

The remaining capacitive coupling between the energizing coil and the output leads is preferably neutralized or balanced out by providing adjustable capacitive means between at least one of the supply leads and at least one of the output leads or connections. The connection and adjustment of such capacitive means are such as to balance out the distributed capacitive coupling between the energizing coil and the electrode leads. Preferably such capacitive means takes the form of a variable balancing capacitor, usually having fixed electrodes connected to the supply leads, and a movable capacitive electrode connected to one of the output leads. By adjusting the movable capacitive electrode into a coupling relationship with one of the fixed capacitive electrodes, it is possible to neutralize or balance out the distributed capacitive coupling between the coil and the signal electrode leads. The balancing capacitor can be arranged in various alternative ways. Thus, it is possible to connect the fixed electrodes to the signal output leads, while connecting the movable electrode to one of the supply leads for the energizing coil.

It will be evident that three adjustable controls are preferably provided for minimizing the stray signals picked up by the signal electrodes and the electrode leads. By adjusting and readjusting all three controls for minimum error signal output, it is possible to reduce the error signal output to a negligible value, so that the mechanical zero corresponds very closely to the electronic zero. Thus, for most flow measurements, the electronic zero can be used so that it is not necessary to provide a remote control occulsion device, capable of mechanically stopping the blood flow in the blood vessel.

Heretofore, it has been the practice to encapsulate flowmeter probes in a moisture-proof plastic material, such as an acrylic or epoxy resin. In accordance with the present invention, a soft resilient material, such as silicone rubber, is employed for the final encapsulation of the flowmeter probe. The soft resilient material is adapted to be compressed by the pulsations in the blood vessel due to the heart beat. It has been found that the soft resilient encapsulating material avoids the problem of damage to the wall of the blood vessel due to the compression of the wall between the pulsating blood stream and a rigid flowmeter probe encapsulated in a hard plastic such as an acrylic or epoxy resin. Such damage to the blood vessel wall may cause it to deteriorate within days or weeks so that the blood vessel wall becomes incapable of withstanding the blood pressure. The blood vessel wall may then blow out adjacent the flowmeter probe so as to cause a fatal hemorhage in the laboratory animal. The provision of a soft resilient encapsulating material prevents such damage to the blood vessel walls, so that flowmeter probes can remain implanted for a long period of time without causing failure of the blood vessels on which they are mounted.

Further objectives, advantages and features of the present invention will appear from the following description taken with the accompanying drawings in which:

FIG. 1 is a diagrammatic view showing a flowmeter, constituting an illustrative embodiment of the present invention, including a probe or transducer, shown in perspective, and the associated balancing and neutralizing circuits for minimizing the zero flow output of the transducer.

FIG. 2 is a diagrammatic side elevation of the transducer or probe, omitting the encapsulating material for clarity of illustration.

FIG. 3 is a side elevation of the transducer after a portion of the encapsulating material has been applied.

FIG. 4 is a side elevation showing the transducer after the final layer of encapsulating material has been applied.

FIG. 5 is a side elevation showing the finished transducer, and illustrating the manner in which the soft resilient encapsulating material can be flexed to provide for the insertion of a blood vessel into the transducer.

FIG. 6 is a fragmentary, greatly enlarged section taken generally along the line 6—6 in FIG. 4.

FIG. 7 is a reproduction of a recorder trace showing the type of output produced by the flowmeter.

FIG. 8 is a diagrammatic enlarged view of a balancing capacitor to be employed in the circuit of FIG. 1.

FIG. 9 is a fragmentary circuit diagram showing an alternative balancing arrangement for use in the circuit of FIG. 1.

FIG. 1 constitutes a diagrammatic illustration of a complete flowmeter 10, which is especially well adapted for measuring the flow of blood in a laboratory animal or a human patient, but may also be employed for measuring the flow of other electrically conductive liquids. The flowmeter 10 comprises a transducer or probe 12, which is shown greatly enlarged in FIG. 1.

The transducer 12 utilizes an electromagnet 14 including an energizing coil 16, which may be split into two or more portions. The electromagnet 14 may be of either the iron core or the air core type. As shown, the coil 16 is wound around a core 18 which is preferably made of iron or some other material having a high magnetic permeability. The core 18 may be solid, laminated or molded and sintered from a powdered material, such as ferrite, for example. The core may also be made of a non-magnetic material, such as a suitable resinous plastic. As shown, the core 18 is generally C shaped so as to fit around a blood vessel 20, as indicated in FIG. 2. It will be understood that a tube made of a plastic material or the like may be employed instead of the blood vessel 20. In either case, a stream of blood, or some other electrically conductive liquid, is caused to flow transversely through the magnetic field produced by the electromagnet 14 when the coil 16 is energized.

Supply leads 22 and 24 are connected to the energizing coil 16. The supply leads 22 and 24 are preferably incorporated into a cable 25, which should be made as small in diameter as possible so that it can readily be brought out of the body of a laboratory animal through a surgical incision. The leads 22 and 24 are employed to supply the coil 16 with an energizing current, which could be a direct current but ordinarily is an alternating or pulsating current.

The movement of the blood across the magnetic field induces or generates a voltage or electromotive force (emf.) in the stream of blood. The voltage is in the form of an alternating or pulsating signal, according to the type of current which is employed to energize the coil 16.

The voltage is picked up by signal electrodes 26 and 28 which form electrical connections to the stream of blood. Ordinarily, the electrodes 26 and 28 contact the walls of the blood vessel at diametrically opposite points. The walls are electrically conductive due to the presence in them of blood and other body fluids.

The signal electrodes 26 and 28 extend along an axis which is transverse and preferably perpendicular to the magnetic field, and also to the direction of movement of the blood. The generated voltage is at a maximum along such a perpendicular axis. In the fabrication of the transducer 12, the electrodes 26 and 28 are preferably formed from a single straight piece of wire 30 which is made of a corrosion-resistant material, such as platinum or the like.

When a plastic tube or the like is employed instead of the blood vessel 20, it will be understood that the electrodes 26 and 28 extend through the walls of the tube so as to contact the stream of blood or the like within the tube.

The transducer 12 also preferably includes a ground electrode 32, adapted to contact the blood stream or blood vessel 20 at a neutral or intermediate point between the signal electrodes 26 and 28. As shown, the ground electrode 32 is positioned to contact the wall of the blood vessel 20 at a point displaced by 90° from the signal electrodes 26 and 28. It will be understood that the coil 16 is insulated by plastic material or otherwise from the ferro-magnetic core 18, which ordinarily is made of solid or laminated iron. The entire coil 16 may be imbedded in an insulating plastic material. The imbedded coil 16 is indicated in the enlarged cross-section of FIG. 6. After the coil 16 has been completed, it may be covered with a layer 34 of an epoxy or acrylic resin, or some other suitable material which is moisture proof and provides electrical insulation.

An electrostatic shield 36 is preferably provided around the coil 16. Such shield 36 may be in the form of a layer of conductive paint, or some other conductive material, applied over the insulating layer 34. The shield 36 is indicated by a broken line in FIG. 2. It will be noted that the shield 36 is grounded. This may be accomplished by providing a connection between the shield 36 and the grounded core 18.

It is necessary to provide output leads for the signal electrodes 26 and 28. As shown in FIGS. 1 and 2, an output lead 38 is provided for the electrode 26. In accordance with one feature of the present invention, two output leads 40 and 42 are connected to the other electrode 28. All of the output leads 38, 40 and 42 are brought out through the cable 25, which preferably includes a conductive braid or some other suitable shield 44 around the leads 38, 40 and 42. The shield 44 is grounded and is connected to the core 18 so as to provide a ground connection for the core. It will be understood that the shield 44 minimizes the coupling between the supply leads 22 and 24 and the output leads 38, 40 and 42 and is effective to minimize the pickup of stray signals and noise by the output leads.

If there is any linkage of magnetic flux between the electromagnet 14 and the output circuit comprising the electrodes 26 and 28 and the leads 38, 40 and 42, there will be transformer type coupling between the coil 16 and the output circuit. Due to such coupling, the output circuit will act in the manner of a transformer secondary winding, while the coil 16 functions as the primary winding. To minimize such transformer type coupling, it has been the practice to adjust the position of the electrodes and the electrode leads so that they are in a plane which is parallel to the magnetic field. The linkage of flux with the output circuit is thereby minimized. However, it is difficult if not impossible to position the electrodes and the output leads with such accuracy that the transformer type coupling is reduced to an acceptable level.

In accordance with the present invention, the two output leads 40 and 42 are employed in a balancing circuit so that the transformer type coupling can be virtually nullified. The leads 40 and 42 are positioned so that they pick up transformer secondary signals of opposite polarities. Thus, the leads 40 and 42 are positioned on opposite sides of a neutral plane extending parallel to the magnetic field. Such positioning of the leads 40 and 42 is clearly shown in FIG. 1. All three leads 38, 40 and 42 pass through an opening 46 in the core 18, and then into the cable 25.

To balance out the transformer type coupling, a potentiometer 48 is preferably connected between the two electrode leads 40 and 42. As shown, the potentiometer 48 is of the resistive type, but may be of any other suitable type. The illustrated potentiometer 48 includes an adjustable tap or slider 50 which affords the output connection from the electrode 28. The lead 38 provides the other output connection from the electrode 26. The tap 50 is adjusted to the setting which produces the minimum error signal output from the transducer 12. The potentiometer 48 is ordinarily connected to the remote end of the cable from the transducer or probe 12.

To provide an additional balancing adjustment, a second potentiometer 52 is preferably connected between the supply leads 22 and 24, extending to the coil 16. The illustrated potentiometer 52 is of the resistive type, but may be of any other suitable type. The potentiometer 52 includes an adjustable tap or slider 54 which is preferably grounded. The tap 54 is adjusted to the position which minimizes the error signal output from the transducer. The potentiometers 48 and 52 may be adjusted alternately to minimize error signal output. The provision of the potentiometer 52 results in the operation of the coil 16 in a balanced relationship to the electrodes 26 and 28 and the output leads 38, 40 and 42.

Even with the balancing potentiometer 52, there may remain a small amount of distributed capacitive coupling between the coil 16 and the output circuit, comprising the electrodes 26 and 28 and the leads 38, 40 and 42. In accordance with the present invention, such capacitive coupling is balanced out or neutralized by capacitive means 56 connected between at least one of the supply leads 22 and 24 and at least one of the output leads 38, 40 and 42. Preferably, the capacitive means take the form of a variable balancing capacitor which may be adjusted to provide neutralizing capacitive coupling of either polarity.

As shown, the variable capacitor 56 comprises fixed capacitive electrodes 58 and 60 connected to the supply leads 22 and 24. The capacitor 56 also preferably comprises a movable capacitive electrode 62 which can be moved into a capacitive coupling relationship with either of the fixed electrodes 58 and 60. As shown, the movable capacitive electrode 62 is connected to one of the output leads or connections, in this case the output lead 38 extending from electrode 26. It would also be possible to connect the movable electrode 62 to one of the leads 40 and 42 or to the potentiometer tap 50.

By properly adjusting the movable capacitive electrode 60, a small amount of capacitive coupling is produced of a polarity such as to balance out the distributed capacitive coupling between the coil 16 and the output circuit comprising the electrodes 26 and 28 and the leads 40 and 42. The variable balancing capacitor 56 is adjusted in conjunction with the potentiometers 48 and 52 so as to produce a minimum error signal output. Thus, the error signal is very small at the mechanical zero of the transducer, which is produced when the blood flow is stopped. In a laboratory animal, the blood flow can be stopped momentarily by clamping or otherwise occluding the blood vessel on which the transducer 12 is mounted.

Remote control occlusion devices are often implanted in laboratory animals in connection with flowmeter transducers. Such an occlusion device may include an inflatable tube or bulb which tightens a suture or snare around a blood vessel. The inflation may be accomplished by supplying compressed air to the tube or bulb through a small tube made of plastic or the like.

With the use of the present invention, the mechanical zero signal is reduced to such an extent that it corresponds very closely to the electronic zero, which is produced when the energizing signal is removed from the coil 16. Thus, with the present invention, accurate flow measurements can be made on the basis of the electronic zero so that it often is not necessary to provide a remote control occlusion device.

The balancing capacitor 56 may be of the construction shown diagrammatically in FIG. 8. It will be seen that the fixed electrodes 58 and 60 are in the form of sector-shaped plates disposed at diametrically opposite points relative to the rotary axis of the movable electrode 62, which is also in the form of one or more sector-shaped plates mounted on a rotary shaft 64. It will be understood that each of the electrodes 58, 60 and 62 may comprise a single plate or two or more parallel plates.

If desired, the connections to the variable capacitor 56 may be rearranged so that the fixed electrodes 58 and 60 are connected to the signal output lead 38 and either of the output leads 40 and 42, or to the output connection provided by the adjustable tap 50. The movable electrode 62 may then be connected to either of the supply leads 22 and 24.

A modified capacitive balancing arrangement is shown in FIG. 9, comprising two separate variable or adjustable capacitors 66 and 68. As shown, the capacitors 66 and 68 are connected from one of the signal output leads to the supply leads 22 and 24. In this case, the capacitors 66 and 68 are connected to the signal output lead 38, but the connection may be made to either of the leads 40 and 42, or to the output connection afforded by the adjustable tap 50. Here again, the connections to the capacitors 66 and 68 may be rearranged so that they are connected between one of the supply leads 22 and 24 and the signal output leads 38 and either 40 or 42, or the tap 50. The capacitors 66 and 68 are adjusted to provide minimum error signal output.

In most cases, only one of the capacitors 66 and 68 is actually necessary to balance out the distributed capacitive coupling for any particular transducer 12. If all of the transducers to be used with the flowmeter are closely similar, only one of the capacitors need be provided.

The transducer 12 and the balancing devices 48, 52 and 56 may be employed with an electronic circuit which may be of any conventional or suitable construction. As shown, the electronic circuit comprises an oscillator 70 which generates a signal of a suitable frequency to energize the coil 16 of the electromagnet 14. Such signal is supplied to a magnet drive amplifier 72 to which the supply leads 22 and 24 are connected. The driving signal to the coil 16 of the electromagnet 14 is preferably of the sine wave type, but may also be of the square wave type.

The output signal from the transducer 12 developed between the output lead 38 and the adjustable tap 50 is supplied to a conventional differential preamplifier 74, one output of which is preferably connected to an oscilloscope 76 so that the wave form of the output signal can be observed. The preamplifier 74 also has an output connection to a gate demodulator unit 78 which receives gating pulses from a pulse generator 80. The oscillator 70 has an output connection to the pulse generator 80 so that the gating pulses correspond in frequency to the magnet drive signal.

The pulse generator 80 incorporates a phase shifting circuit so that the phase or timing of the gating pulses can be adjusted to sample the desired portion of each output cycle from the transducer 12. The gate demodulator 78 produces an output signal representing the sampled portions of the output cycles. This sampling type of demodulation improves the signal-to-noise ratio of the flowmeter. A chart recorder 82 is preferably connected to the output of the gate demodulator unit 78 which preferably also includes circuits for varying the output frequency response. By limiting the frequency response, the noise components in the output can be reduced.

FIG. 7 is a reproduction of a recorder trace or chart which is typical of the type of output produced by the flowmeter. The pulsations of the blood flow due to the successive heart beats can be clearly seen. The trace of FIG. 7 includes portions 84 corresponding to electronic zero produced by removing the energizing signal from the coil 16. The trace also includes a portion 86 corresponding to mechanical zero produced by an occlusion or stoppage of the blood vessel. It will be seen that the mechanical zero corresponds closely to the electronic zero. Thus, it is not strictly necessary to provide for a mechanical zero or occlusion.

Even if a remote control occlusion device is provided, its use can be very infrequent so that there will be very little possibility of damaging the blood vessel or rendering the occlusion device inoperative by repeated use. In most cases an occlusion device will become inoperative or faulty after repeated use.

FIGS. 2–5 illustrate successive stages in the manufacture of the flowmeter probe or transducer 12. As previously indicated, the coil 16 is covered with the insulating layer 34. The electrostatic shield 36 is then applied, usually in the form of conductive paint. It is preferred to cover the conductive shield 36 with another layer 87 of an insulating material, such as an epoxy or acrylic resin. The electrodes 26 and 28 and the output leads 38, 40 and 42 are then positioned as shown in FIG. 2. Next, the electrodes and the electromagnet 14 are imbedded in a layer 88 of encapsulating material, such as an epoxy or acrylic resin or some other suitable material which is moisture proof and affords good electrical insulation.

FIG. 3 shows the transducer 12 after the encapsulating layer 88 has been applied. It will be seen that the signal electrodes 26, 28 are supported solely by the encapsulating material 88. Thus, the positions of the electrodes 26 and 28 and also the positions of the electrode leads 40 and 42 must be adjusted properly before the encapsulating material has hardened.

It has been the practice to encapsulate flowmeter transducers in hard and rigid materials such as epoxy and acrylic resins. In accordance with the present invention, however, the encapsulation of the transducer 12 is completed by applying a final layer 90 of a soft resilient material, such as silicone rubber, for example. The transducer 12 then has the appearance shown in FIG. 4. The silicone rubber encapsulating material is shaped so that the transducer has a ring-shaped body 92 with a generally circular opening 94 therein to receive the blood vessel 20, which is indicated in broken lines in FIG. 5 as well as in FIG. 2.

In the semi-finished form of FIG. 4, the electrodes 26, 28 and 32 still project into the opening 94 and the body 92 is relatively rough. By filing or scraping operations, the body 92 is smoothed out, and the projecting portions of the electrodes are removed so that the electrodes are substantially flush with the body. The transducer 12 then has the appearance shown in FIG. 5.

To provide for the insertion of the blood vessel 20 into the opening 94, a radial slit 96 is preferably cut through the silicone rubber encapsulating material 90 at a point near one end of the gap between the electrode 28 and the core 18. The portion 98 of the rubber encapsulating material extending across such gap can then be flexed outwardly, as shown in broken lines in FIG. 5, to provide an entrance for the insertion of the blood vessel into the ring-shaped body 92.

After the blood vessel has been inserted, the flexible portion 98 is returned to its original position and preferably is securely anchored by the use of sutures or otherwise to prevent any escape of the blood vessel and to maintain a snug fit between the ring-shaped body 92 and the blood vessel. Such a snug fit insures that the ends of the electrodes 26, 28 and 32 will make good electrical contact with the blood vessel. Moreover, any movement of the transducer on the blood vessel is prevented.

The soft resilient encapsulating material 90 is compressible in response to the pulsations of the blood vessel 20 due to the variations of the blood pressure therein. Thus, the encapsulating material yields sufficiently to prevent any undue compression of the wall of the blood vessel when it pulsates due to the heart beat. Such pulsations of the blood vessel are particularly noticeable on the ascending aorta of a laboratory animal.

It has been found that the flowmeter transducers of the present invention can be implanted on the blood vessels of a laboratory animal for a long period of time without causing any appreciable damage to the blood vessel. Thus, blood flow studies can be carried out for many months. On the other hand, it has often been observed that conventional rigid flowmeter transducers cause deterioration of blood vessels to such an extent that the blood vessels can no longer withstand the normal blood pressure, whereupon a blowout of a blood vessel is likely to occur adjacent to a flowmeter transducer. This usually results in a fatal hemorrhage. Such undesirable incidents are avoided by the provision of a soft resilient encapsulating material in accordance with the present invention.

It is not necessary to have zero flow to make the three adjustments to minimize the error signal. The adjustments described can also be made with the probe on a pulsating vessel, with blood flowing through the vessel. The flowmeter phase switch is switched to a sampling which is 90° out of phase with the flow signal. At this point, only transformer voltage and other error signals will be present. The three controls are adjusted to give a minimum signal, which means all error signals are reduced. Then, when the phase switch is turned back to flow, electronic zero will coincide with true mechanical zero. The importance of the above is that it is not necessary to have mechanical occlusion or actual zero flow to make the adjustments.

I claim:

1. An electromagnetic flowmeter for measuring the rate of flow in a stream of an electrically conductive liquid,
    comprising an electromagnet for producing a magnetic field to extend across the stream of liquid,
    said electromagnet including an energizing coil having supply leads connected thereto,
    said flowmeter comprising first and second electrodes for receiving the voltage generated in the liquid due to the movement of the liquid across the magnetic field,
    said electrodes being mounted along an electrode axis transverse to the liquid stream and also transverse to the magnetic field,
    first and second output connections extending to said first and second electrodes,
    a potentiometer connected between said supply leads and having an adjustable tap,
    and means establishing a ground connection to said tap.

2. A flowmeter according to claim 1,
    including a ground electrode for contacting said liquid stream and disposed at a neutral point between said first and second electrodes,
    said ground electrode being connected to said ground connection.

3. A flowmeter according to claim 1,
    including adjustable capacitive balancing means connected between at least one of said supply leads and at least one of said output connections for neutralizing the distributed capacitive coupling between said coil and said output connections.

4. A flowmeter according to claim 1,
    including an electrostatic shield between said coil and said output connections.

5. An electromagnetic flowmeter for measuring the rate of flow in a stream of an electrically conductive liquid,
    comprising an electromagnet for producing a magnetic field to extend transversely across the stream of liquid,
    said electromagnet including an energizing coil with supply leads connected thereto,
    said flowmeter comprising first and second electrodes for receiving the voltage generated in the liquid stream due to the movement of the liquid across the magnetic field, said electrodes being mounted along an electrode axis transverse to the liquid stream and also transverse to the magnetic field, first and second output connections extending from said first and second electrodes, and capacitive balancing means for selectively producing capacitive coupling between one of said supply leads and one of said output connections to neutralize the distributed capacitive coupling between said coil and said output connections.

6. A flowmeter according to claim 5,
in which said capacitive balancing means take the form of a variable capacitor connected between at least one of said supply leads and at least one of said output connections.

7. A flowmeter according to claim 5,
in which said capacitive balancing means take the form of a variable capacitor having fixed capacitive electrodes connected to said supply leads and a movable capacitive electrode connected to one of said output connections,
said movable capacitive electrode being movable into coupling relation with either of said fixed capacitive electrodes.

8. A flowmeter according to claim 5,
including a ground electrode for contacting said stream and disposed at a neutral point between said first and second electrodes,
and means establishing a ground connection to said ground electrode.

9. A flowmeter according to claim 8,
including a potentiometer connected between said supply leads and having an adjustable tap connected to said ground connection.

10. A flowmeter according to claim 5,
including an electrostatic shield between said coil and said output connections.

11. An electromagnetic flowmeter probe for measuring the flow of blood in a blood vessel,
comprising a generally C-shaped electromagnet for producing a magnetic field to extend transversely across the blood vessel,
said electromagnet including a generally C-shaped magnetic core having an energizing coil mounted thereon and supply leads connected to said coil,
said flowmeter probe comprising first and second electrodes for contacting the blood vessel to receive the voltage generated in the blood stream due to the movement of the blood across the magnetic field,
said electrodes being mounted along an electrode axis transverse to the blood vessel and also transverse to the magnetic field,
output leads connected to said electrodes,
a substantially rigid body encapsulating said electromagnet and said output leads and providing a substantially rigid support for said electrodes and said electromagnet,
said body having an opening therein for receiving the blood vessel,
and a layer applied to said body and made of a soft resilient material which can be compressed by the pulsations of the blood vessel to avoid damage to the walls of the blood vessel.

12. A flowmeter probe according to claim 11,
in which said layer is made of soft silicone rubber.

13. A flowmeter probe according to claim 11,
in which said layer is ring-shaped to encircle the blood vessel,
said layer having a transverse slit therein and a flexible portion adjacent said slit,
said flexible portion being movable to provide an entrance slot for the insertion of a blood vessel into the opening in the body.

14. An electromagnetic flowmeter for measuring the rate of flow in a stream of an electrically conductive liquid,
comprising an electromagnet for producing a magnetic field to extend transversely across the stream of liquid,
said electromagnet including an energizing coil,
said flowmeter comprising first and second electrodes for receiving the voltage generated in the liquid due to movement of the liquid across the magnetic field,
said electrodes being mounted along an electrode axis transverse to the liquid stream and also transverse to the magnetic field,
a first output lead connected to said first electrode,
second and third output leads connected to said second electrode,
said first lead and said electrodes being generally in a plane extending in the direction of the magnetic field to minimize transformer-type induction between the coil and the first lead,
said second and third leads being on opposite sides of said plane,
a potentiometer connected between said second and third leads and having an output tap adjustable to a null point for minimum transformer-type induction between said coil and said leads,
said first output lead and said output tap forming signal output connections,
supply leads connected to said energizing coil,
and a second potentiometer connected between said supply leads and having an adjustable tap with a ground connection thereto.

15. A flowmeter according to claim 14
including a ground electrode disposed at a neutral point between said first and second electrodes,
and means for establishing a ground connection to said ground electrode.

16. A flowmeter according to claim 14, including an electrostatic shield disposed around said coil and minimizing the capacitive coupling between said coil and said output leads.

17. An electromagnetic flowmeter for measuring the rate of flow in a stream of an electrically conductive liquid,
comprising an electromagnet for producing a magnetic field to extend transversely across the stream of liquid,
said electromagnet including an energizing coil,
said flowmeter comprising first and second electrodes for receiving the voltage generated in the liquid due to movement of the liquid across the magnetic field,
said electrodes being mounted along an electrode axis transverse to the liquid stream and also transverse to the magnetic field,
a first output lead connected to said first electrode, second and third output leads connected to said second electrode, said first lead and said electrodes being generally in a plane extending in the direction of the magnetic field to minimize transformer-type induction between the coil and the first lead, said second and third leads being on opposite sides of said plane, a potentiometer connected between said second and third leads and having an output tap adjustable to a null point for minimum transformer-type induction between said coil and said leads, said first output lead and said output tap forming signal output connections, supply leads connected to said energizing coil, and adjustable capacitive balancing means connected between at least one of said supply leads and at least one of said output connections for neutralizing the distributed capacitive coupling between said coil and said output leads.

18. A flowmeter according to claim 17.
in which said capacitive balancing means take the form of a variable capacitor having fixed capacitive electrodes connected to said supply leads, and a movable capacitive electrode connected to one of said output connections, said movable capacitive electrode being selectively movable into capacitive coupling relation with either of said fixed capacitive electrodes.

19. A flowmeter according to claim 17,
including a ground electrode for contacting said stream and disposed at a neutral point relative to said first and second electrodes, and means for establishing a ground connection to said ground electrode.

20. A flowmeter according to claim 17, including an electrostatic shield disposed around said coil and minimizing the capacitive coupling between said coil and said output leads.

21. An electromagnetic flowmeter for measuring the rate of flow in a stream of an electrically conductive liquid, comprising an electromagnet for producing a magnetic field to extend transversely across the stream of liquid, said electromagnet including an energizing coil, said flowmeter comprising first and second electrodes for receiving the voltage generated in the liquid due to movement of the liquid across the magnetic field, said electrodes being mounted along an electrode axis transverse to the liquid stream and also transverse to the magnetic field, a first output lead connected to said first electrode, second and third output leads connected to said second electrode, said first lead and said electrodes being generally in a plane extending in the direction of the magnetic field to minimize transformer-type induction between the coil and the first lead, said second and third leads being on opposite sides of said plane, a potentiometer connected between said second and third leads and having an output tap adjustable to a null point for minimum transformer-type induction between said coil and said leads, said first output lead and said output tap forming signal output connections, a ground electrode for contacting the stream and disposed at a neutral point between said first and second electrodes, means for establishing a ground connection to said ground electrode, a pair of supply leads connected to said energizing coil, a second potentiometer connected between said supply leads and having an adjustable tap connected to said ground connection, and adjustable capacitive balancing means for selectively providing capacitive coupling between at least one of said supply leads and at least one of said output connections to neutralize the distributed capacitive coupling between said coil and said output leads.

22. A flowmeter according to claim 21, including an electrostatic shield disposed around said coil and minimizing the capacitive coupling between said coil and said output leads.

* * * * *